United States Patent
Karwath et al.

Patent Number: 5,600,216
Date of Patent: Feb. 4, 1997

[54] BRIDGE CIRCUIT FOR DRIVING A BRUSHLESS DC MOTOR

[75] Inventors: Arno Karwath, Rottweil; Mojtaba Moini, Konigsfeld, both of Germany

[73] Assignee: Papst-Motoren GmbH & Co. KG, Germany

[21] Appl. No.: 91,665

[22] Filed: Jul. 13, 1993

[30] Foreign Application Priority Data

Jul. 15, 1992 [DE] Germany ............... 42 23 208.2

[51] Int. Cl.$^6$ ........................................ H02P 1/04
[52] U.S. Cl. .................. 318/291; 318/293; 388/907.2
[58] Field of Search .................... 318/293, 291; 363/98, 124, 132, 63; 307/578; 388/907.2

[56] References Cited

U.S. PATENT DOCUMENTS

| | | | |
|---|---|---|---|
| 4,319,170 | 3/1982 | Brent | 318/293 X |
| 4,651,269 | 3/1987 | Matsumura | 363/63 |
| 4,680,513 | 7/1987 | Kennedy | 318/285 |
| 4,705,997 | 11/1987 | Juzswik | 318/293 X |
| 4,985,666 | 1/1991 | Nakabayashi | 318/293 X |
| 5,111,375 | 5/1992 | Marshall | 363/60 |

*Primary Examiner*—Brian Sircus
*Attorney, Agent, or Firm*—Fitch, Even, Tabin & Flannery

[57] ABSTRACT

The invention pertains to a bridge circuit and a drive circuit for it, in particular for driving a brushless DC motor. The bridge circuit exclusively consists of n-channel field-effect transistors. An auxiliary potential generated by at least one potential sliding capacitor is provided for driving these particular field-effect transistors which are connected to the positive supply voltage. The auxiliary potential is already built up before the starting of the motor by means of special switching measures, and said auxiliary potential exists at a defined intensity during extended standstill times of the motor.

17 Claims, 1 Drawing Sheet

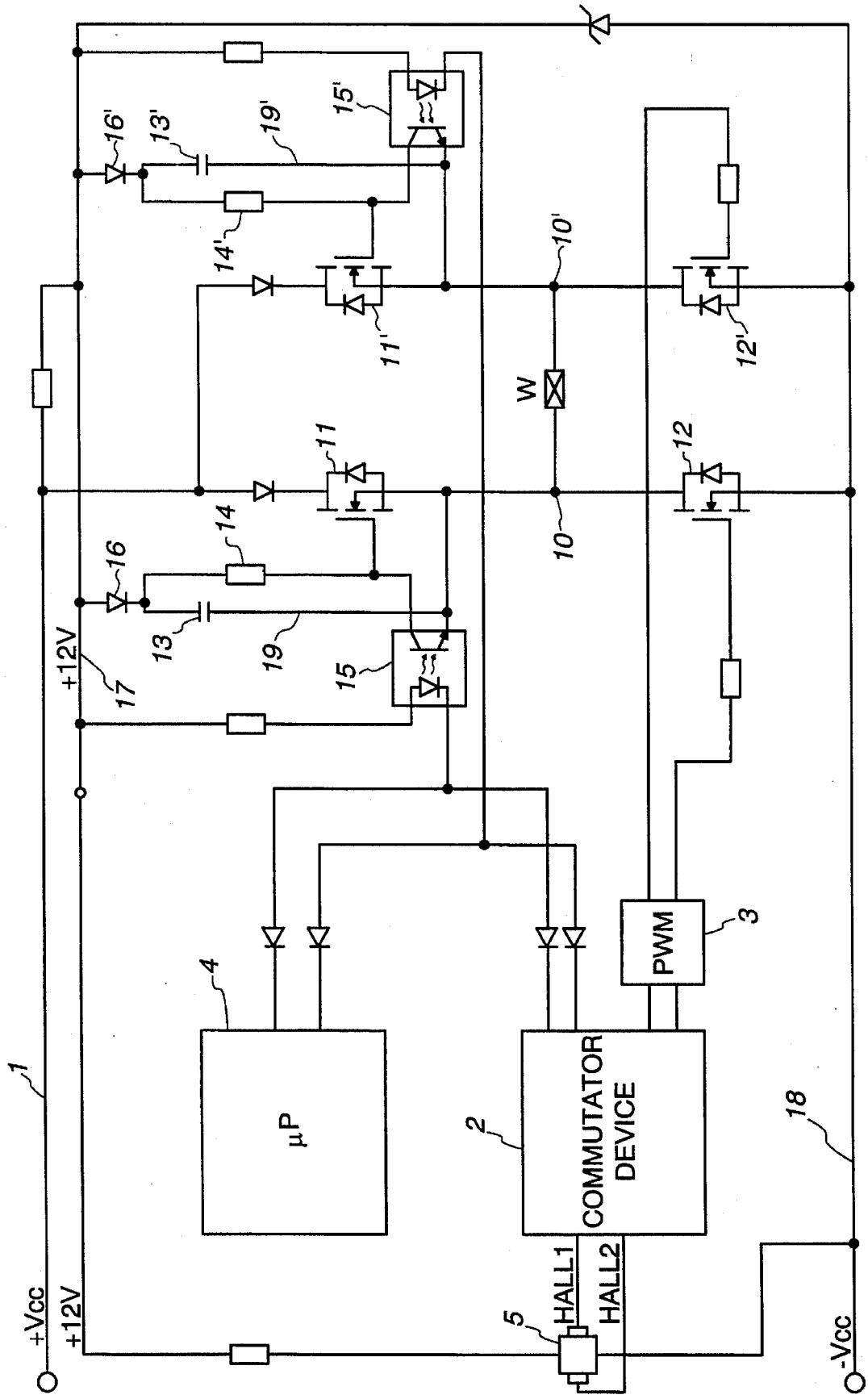

BRIDGE CIRCUIT FOR DRIVING A BRUSHLESS DC MOTOR

BACKGROUND OF THE INVENTION

1. Field of the Invention

The invention pertains to a bridge circuit comprising a plurality of field-effect power transistors for driving a brushless DC motor and in particular a drive circuit for driving said power transistors as a bridge circuit for driving a brushless DC motor having a plurality of n-channel field-effect transistors (FETs) which are fed by one single DC voltage source.

2. Description of the Prior Art

It is desirable to provide a simple drive circuit which facilitates a safe driving of power transistors connected to the positive line of a supply voltage without requiring the utilization of an additional voltage source in form of a DC-DC transformer or p-channel transistors.

It is also very desirable for cost reasons to construct a bridge circuit consisting of field-effect transistors exclusively with n-channel transistors since p-channel transistors with identical capacity are in accordance with the current state of the art substantially larger and more expensive than n-channel transistors. However, there exists the specific problem that the transistors connected to the positive line of the supply voltage require a gate potential in order to be switched on, with said gate potential lying substantially above the potential of the positive line of the supply voltage and thus not easily available. The obvious solution of generating this auxiliary potential by means of a DC-DC voltage transformer or a battery is not very advantageous for cost reasons.

SUMMARY OF THE INVENTION

It is an object of the invention to solve various problems in the prior art.

Another object of the invention is attained by the provision of an auxiliary potential generated by at least one potential sliding capacitor to drive transistors which are connected to the positive line of a DC voltage source whereby the auxiliary potential is at a greater potential than the positive line of the DC voltage source.

A further object of the invention is to turn off the transistors connected to the positive line of the DC power supply voltage before the start of the motor during which at least one potential sliding capacitor is charged.

Briefly summarized, the present invention relates to an n-channel field effect transistor bridge circuit connectable across a positive output and a negative output of a single DC voltage source for driving a brushless DC motor. An auxiliary potential generated by at least one potential sliding capacitor is provided for driving the transistors connected to the positive power supply output voltage. The auxiliary potential is provided through a charged capacitance prior to the starting of the motor by switching the sliding potential capacitor across the voltage source.

BRIEF DESCRIPTION OF THE DRAWING

FIG. 1 is a schematic diagram depicting an embodiment of a bridge circuit for driving a brushless DC motor in accordance with the present invention.

DETAILED DESCRIPTION OF THE PREFERRED EMBODIMENT

According to the invention, the auxiliary potential is instead generated by means of at least one potential sliding capacitor (13, 13') which during operation of the bridge circuit is at times switched with transistor (12, 12') causing the negative lead (19, 19') of the capacitor (13, 13') to switch the $-V_{cc}$ (18), a relatively lower potential in order to be able to charge said capacitor with the supply voltage. The potential sliding capacitor is subsequently raised to a relatively higher potential (10, 10'), whereby the positively charged pole of said capacitor reaches a potential which lies above the positive potential of the positive line of the supply voltage and may thus serve to drive the gates of the aforementioned transistors.

Such an arrangement of a (generally known) potential sliding capacitor operates perfectly once the capacitor has been charged. However, this required charge does not exist when first starting the motor, namely because at least one of the transistors connected to the positive line of the supply voltage has to be switched on without providing the potential sliding capacitor driving said transistor with a possibility of previously charging itself.

An additional variation of the invention thus suggests that all transistors (11, 11') connected to the positive line (1) of the supply voltage remain turned off at first during a preset period of time after switching on the driving voltage before the start of the motor or another starting command for the motor, so that the potential sliding capacitors (13, 13') driving said transistors have an opportunity to charge themselves during the preset time period to an auxiliary voltage (17) of, for example, 12 V via the diodes (16, 16'), whereby the negative poles (19, 19') of the aforementioned capacitors (13, 13') are connected to the relatively negative potential of the negative line $-V_{cc}$ (18) of the supply voltage by means of the already switched on transistors (12, 12') connected to the negative line $-V_{cc}$ (18) of the supply voltage. The turning off of the aforementioned transistors (11, 11') is obtained by the fact that all outputs of the optocouplers (15, 15') are switched into a conducting mode. The charging process for these capacitors (13, 13') practically requires only a very short period of time, for example, less than one msec. This duration is in accordance with the invention determined by a suitable time control (4), for example, a microprocessor. The turning off of the transistors (11, 11') connected to the positive line of the supply voltage is eliminated after this charging process, and the commutation device (2) which controls the power transistors as a function of the rotor position (for example, by means of at least one Hall generator (5)) takes over the driving of all power transistors (11, 11', 12, 12') by the optocouplers (15, 15') of the aforementioned bridge circuit. An additional characteristic of the invention suggests that the transistors (12, 12') connected to the negative line of the supply voltage may be additionally controlled by means of a pulse width modulator (3).

In the described bridge circuit for driving a brushless DC motor, the transistors which are connected to the positive line of the DC supply and are driven by an auxiliary potential source which provides a greater positive potential than the positive line of the DC supply voltage and is generated by at least one potential sliding capacitor configuration. After switching on the drive voltage, the capacitors (13, 13') are charged by the microprocessor 4 which turns off the upper FET (11, 11') with the optocoupler (15, 15') by causing the optotransistor of the optocoupler to be turned on. Then the FET (12, 12') is turned on with the microprocessor 4 allowing the sliding potential capacitor (13, 13') to be charged. When the FET (12, 12') is turned on, the negative lead (19, 19') of the capacitor (13, 13') is electrically connected with the negative lead 18 of the power supply and the capacitors (13, 13') are charged via the 12 volts supplied to the diode (16, 16'). After the capacitors (13, 13') are charged, the FET (11, 11') can be turned on via the resistor (14, 14') as soon as the optocoupler (15, 15') is turned off. The switching of the FETs (11, 11'), (12, 12') proceeds as follows. When FET (11, 11') is turned off, the capacitor (13, 13') is very slowly discharged and the capacitor (11, 11') remains at a high enough potential to keep FET (11, 11') in a turned on state. When the FET (12, 12') is turned on, the capacitor (11, 11') is then rapidly charged again.

The drive currents flowing through the gates of the field-effect transistors are negligibly small, so that a capacity of, for example, 2.2 μF suffices for the aforementioned potential sliding capacitors (13, 13') in order to maintain the aforementioned transistors (11, 11') switched on for an extended period of time, for example over several minutes. The charge of these capacitors would, however, be slowly depleted for example by self-discharge, if the motor remained hindered or stopped for an extended period of time. The auxiliary potential to drive the transistors (11) or (11') would slowly decrease to a level which no longer suffices for a maximum conductivity of these transistors, so that the power loss due to these transistors would slowly increase to impermissible values. In order to eliminate this hazard, an additional variation of the invention suggests that the aforementioned bridge circuit (11, 11', 12, 12') is switched off in case of a stopped rotor of the motor after a predetermined period of time of, for example, a few seconds by the fact that the transistors (11, 11') connected to the positive line of the supply voltage remain turned off, so that the potential sliding capacitors (13, 13') are charged anew. This turning off of the transistors (11, 11') can be eliminated for a short duration may after an additional preset time period in order to initiate the restarting of the motor. If this attempt to start the motor is not successful, a renewed turning off of the transistors (11) or (11') is performed, and the described process is repeated. The turning off and switch-on times are preferably controlled by a corresponding time control circuit (4), for example by means of a suitably programmed microprocessor.

Although the previous description pertains to a single-phase motor, this fact by no means indicates that the invention is limited to a motor of this type. The previously described invention may also be successfully applied for a two-phase or a three-phase motor. In the instance of a three-phase motor, the number of end stage transistors would be increased to six, whereby three transistors are connected to the positive line of the supply voltage, and three transistors are connected to the negative line of the supply voltage.

We claim:

1. A bridge circuit including n-channel field effect transistors for driving a brushless DC motor, said bridge circuit comprising:
    a DC power source having a positive output and a negative output;
    at least one first n-channel field effect transistor for selectively connecting the positive output to the DC motor and at least one second n-channel field effect transistor for selectively connecting the negative output to the DC motor;
    control means for controlling the first and second n-channel field effect transistors to alternatingly connect the positive output and the negative output to the DC motor;
    a source of auxiliary potential comprising a potential sliding capacitor connected between the positive output and the second n-channel field effect transistor for charging to a predetermined potential when the second n-channel field effect transistor is connecting the negative output to the DC motor; and
    the control means comprises a switch device operative when the second n-channel field effect transistor is not connecting the negative output to the DC motor for connecting the auxiliary potential of the potential sliding capacitor to drive the first n-channel field effect transistor to connect the positive output to the DC motor.

2. The bridge circuit of claim 1 wherein the control means controls the first n-channel field effect transistor to not connect the positive output to the DC motor and controls the second n-channel field effect transistor to connect the negative output to the DC motor for a predetermined period of time after power is first applied by the DC power supply to charge the potential sliding capacitor during the predetermined time period.

3. A bridge circuit in accordance with claim 1 comprising means for coupling the positive potential of said potential sliding capacitor to a gate of the first n-channel field effect transistor.

4. A bridge circuit in accordance with claim 3 wherein said coupling means comprises a resistor.

5. A bridge circuit in accordance with claim 4 wherein said switch device switches said coupling means to lower the electrical potential thereat to electrically disconnect the positive output of the DC power supply from the motor.

6. A bridge circuit in accordance with claim 5 wherein the control means comprises a microprocessor and said switch device comprises an isolated switch operable under control of the microprocessor.

7. A bridge circuit in accordance with claim 6 wherein said switch device comprises an optocoupler.

8. A bridge circuit in accordance with claim 1 wherein a diode connects the sliding potential capacitor to the positive output of the DC power supply allowing a greater positive potential than at the positive output of the DC power supply to be generated by the potential sliding capacitor.

9. An n-channel field-effect transistor bridge circuit connectable across a positive output and a negative output of a single DC voltage source for driving a brushless DC motor, the bridge circuit comprising:
    a capacitor having a first lead line and a second lead line at the capacitor poles for providing electrical connections therewith;
    means for coupling the electrical potential at the first lead line of said capacitor to a gate of at least one transistor of the bridge which connects the positive output of the voltage source to the motor to operably switch voltage to the motor;
    means for connecting the second lead line of said capacitor to at least one transistor of the bridge which connects the negative output of the voltage source to the motor to electrically connect the second lead line to the negative output of the voltage source; and
    means for switching said coupling means to lower the electrical potential thereat to electrically disconnect the positive output of the voltage source from the motor.

10. A bridge circuit in accordance with claim 9 comprising a diode connecting said first lead line of said capacitor to the positive output of the voltage source.

11. A bridge circuit in accordance with claim 10 wherein said diode connecting said capacitor to the positive output of the voltage source allows shifting of the electrical potential at said first lead line of said capacitor to a greater positive potential than the positive output of the voltage source at said gate of said at least one transistor of the bridge.

12. A bridge circuit in accordance with claim 9 wherein said coupling means effectively connects said first lead line of said capacitor to said gate of said at least one transistor of the bridge.

13. A bridge circuit in accordance with claim 12 wherein said coupling means comprises a resistor.

14. A bridge circuit in accordance with claim 9 wherein said connecting means comprises a wired connection of the second lead line of said capacitor to said at least one transistor of the bridge which connects the negative output of the voltage source providing the charging of said capacitor.

15. A bridge circuit in accordance with claim 14 wherein the operation of said at least one capacitor of the bridge which connects the negative output of the voltage source to the motor shifts the potential of said capacitor.

16. A bridge circuit in accordance with claim 9 wherein said switching means comprises an isolated switch operable under microprocessor control.

17. A bridge circuit in accordance with claim 16 wherein said switching means comprises an optocoupler.

* * * * *